June 8, 1926.
W. I. SCHRYVER
1,588,148
GRASS PACKER
Filed May 2, 1923
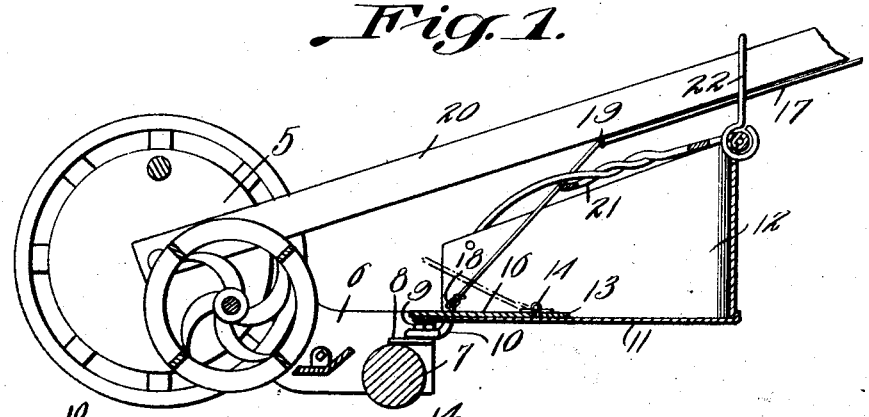
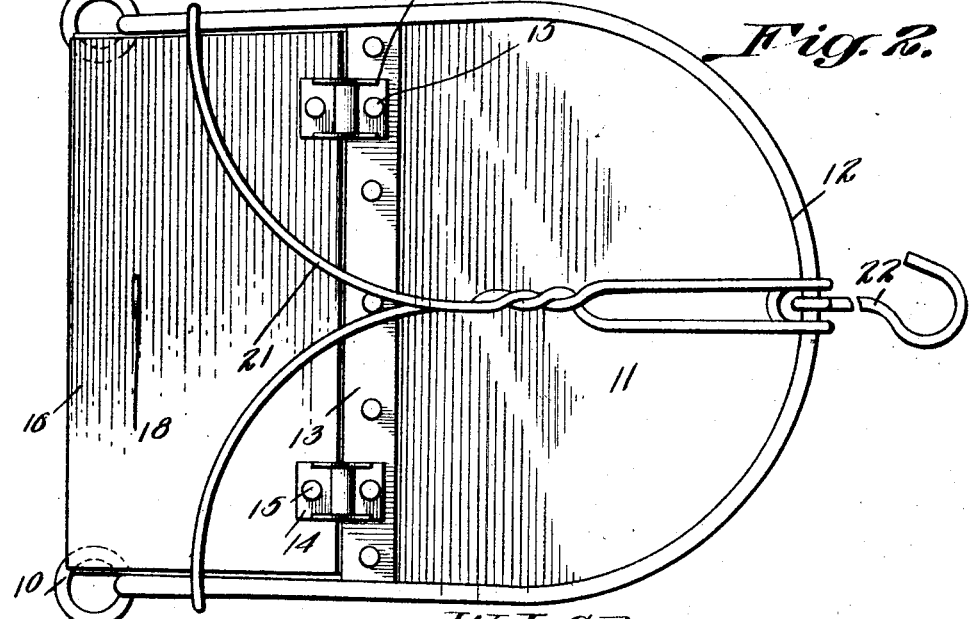
W. I. Schryver, Inventor Patented June 8, 1926.

1,588,148

UNITED STATES PATENT OFFICE.

WASHINGTON I. SCHRYVER, OF PROPHETSTOWN, ILLINOIS.

GRASS PACKER.

Application filed May 2, 1923. Serial No. 636,162.

This invention relates to lawn mower attachments, and more particularly to an attachment especially designed for packing the grass or other matter cut by the lawn mower, in a grass catching device usually mounted on the mower, thereby increasing the capacity of the catching and at the same time preventing the material from being blown from the catcher.

The primary object of the invention is to provide a device of this character which may be readily and easily mounted on the usual lawn mower construction now in use, eliminating the necessity of making alterations in the mower construction to mount the attachment.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through a mower and grass catching receptacle, mounted thereon.

Figure 2 is a plan view of the attachment.

Referring to the drawing in detail, the mower is indicated generally by the reference character 5 and includes rearwardly extending arms 6 that are formed with bearings to accommodate the usual roller 7.

Flanges 8 are secured to the member 6, and provide means for adjustably supporting the usual roller 7. Bolts 9 which pass through the flanges 8 also extend through the eyes 10 formed at the lower front edges of the receptacle as shown by Figure 2 of the drawing. Thus it will be seen that due to this construction, the receptacle may be securely mounted on the mower to insure against displacement thereof.

The body portion of the receptacle is formed preferably of sheet metal and includes a bottom wall 11, side and rear walls 12, the bottom wall extending to a point beyond the front edges of the side walls 12 where material cut by the mower may fall thereon. Secured to the bottom wall 11 at a point substantially intermediate the ends thereof, is a bar 13, which bar provides a support for the hinges 14, which are shown as riveted thereto as at 15, the hinges 14 also having connection with the hinged plate 16 that extends to the forward end of the bottom wall 11 overlying the bottom wall 11.

The hinges 14 are preferably spring controlled so that the plate 16 will be held normally in its active position. The reference character 17 indicates a flexible member which has its forward end connected to the plate 16 through the medium of the eye bolt 18 disposed substantially intermediate the ends of the plate 16, the flexible member 17 passing through the eye bolt secured to the handle 20 of the mower, from where the same passes to a position in proximity to the operator's hand, whereby the flexible member may be conveniently operated.

The side and rear walls are formed with openings to accommodate the ends of the bracing wires 21 that hold the side and rear walls in their vertical positions, the bracing wires being disposed above the upper edges of the side and end walls so that they will not obstruct the passage of material from the mower to the receptacle.

Secured to the rear wall of the receptacle is a hook member 22 that is designed to hook over the handle 20 and support the rear end of the receptacle to insure against the weight of the material carried thereby, bending the securing members disposed at the forward end of the receptacle.

From the foregoing it will be seen that due to the construction as shown and described, when the receptacle becomes filled with grass or the like material, the operator may by pulling the flexible member 17, raise the hinged plate 16 to the end that material in the receptacle is forced towards the rear wall thereof, leaving room in the forward portion of the receptacle to receive material.

It might be further stated that while the hinged plate 16 is being moved, the bottom wall 11 of the receptacle prevents material from falling on the cut portion of the grass surface.

What is claimed as new is:—

In a device of the character described, a receptacle including a bottom and side members, said bottom extending to a point beyond the forward edges of the side members, a transversely disposed bar secured to the bottom, a plate, hinges for connecting the plate to the bar, said plate being of a width to extend beyond the forward edge of the bottom, and adapted to normally lie flat on the bottom, means connected with the plate for moving the plate upwardly, and means for securing the device to a lawn mower.

In testimony that I claim the foregoing as my own, I have hereto affixed my signature.

WASHINGTON I. SCHRYVER.